United States Patent [19]
Martin

[11] Patent Number: 4,913,489
[45] Date of Patent: Apr. 3, 1990

[54] DEVICE FOR VARYING THE DISTANCE BETWEEN THE SEATS IN COMMERCIAL AIRCRAFT

[75] Inventor: Gerard Martin, Longpont-sur-Orge, France

[73] Assignee: Tissmetal Lionel-Dupont, Lyons, France

[21] Appl. No.: 477,245

[22] Filed: Mar. 21, 1983

Related U.S. Application Data

[63] Continuation-in-part of Ser. No. 156,327, Jun. 4, 1980, abandoned.

[51] Int. Cl.$^4$ .............................................. A47C 15/00
[52] U.S. Cl. .................................... 297/232; 297/344; 248/429
[58] Field of Search ............................ 248/429, 503.1; 297/344, 232, 257; 52/9, 52/10

[56] References Cited

U.S. PATENT DOCUMENTS 4,157,797 6/1979 Fox ...................................... 297/232

FOREIGN PATENT DOCUMENTS 0021933 1/1981 European Pat. Off. ............ 297/330

Primary Examiner—Kenneth J. Dorner
Attorney, Agent, or Firm—McAulay, Fisher, Nissen & Goldberg

[57] ABSTRACT

A device for varying the distance between the seats in commercial aircraft, comprising longitudinal rails provided in their upper horizontal flanges with dovetail grooves and holes pierced in the two inner lips of the rail defining this groove, comprises a driving seat and mobile seats disposed in front of and/or behind the driving seat. A transmission mechanism is provided between the driving seat and the mobile seat. The driving seat bears a drive mechanism moved by a motor, this drive mechanism being coupled with elongated connecting members movable in translation, located on each rail and being able to be displaced forwardly or rearwardly by a predetermined distance as a function of the desired change in distance. The transmission mechanism comprises a set of metal slats connecting the feet of the mobile seats together, at rail level, the slats closest to the driving seat being coupled to the elongated connecting members. Means are associated with the feet of the mobile seats for automatically controlling the unlocking of the seat as soon as the slats are displaced.

13 Claims, 8 Drawing Sheets

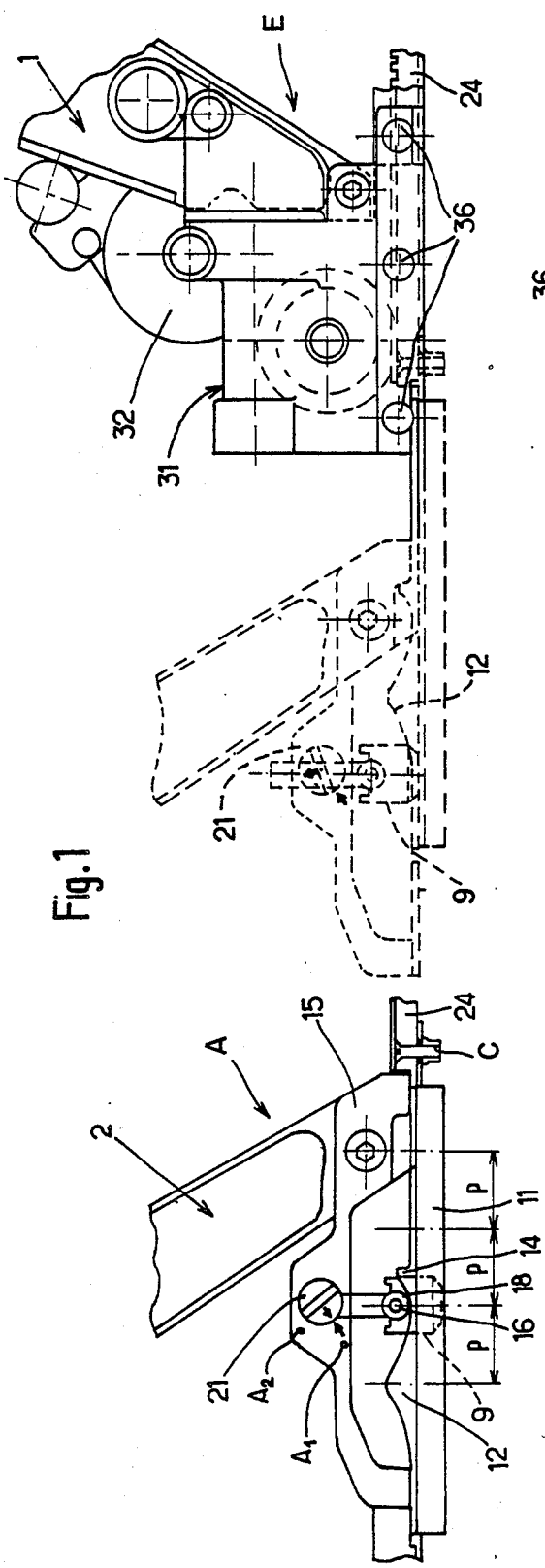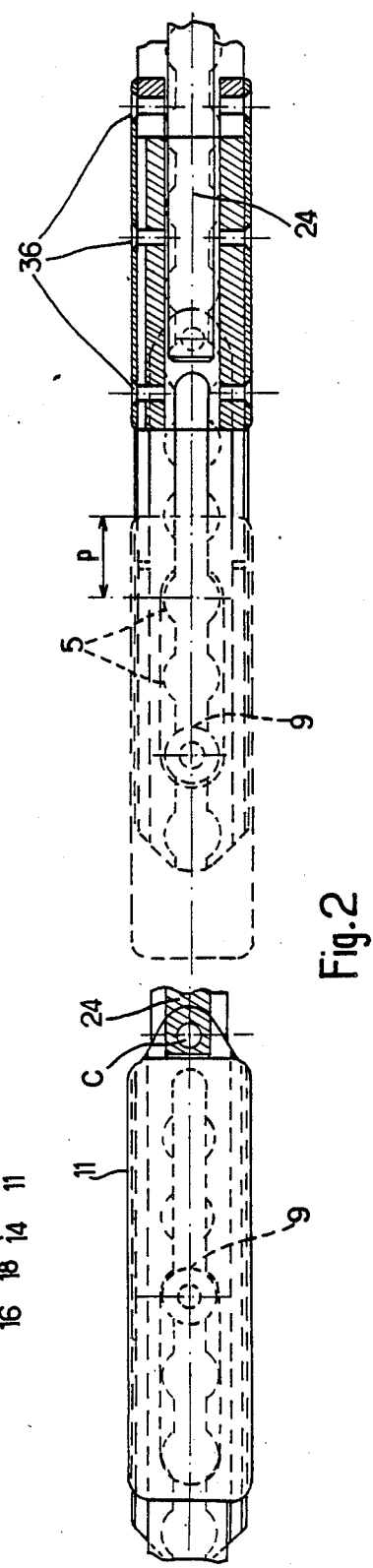

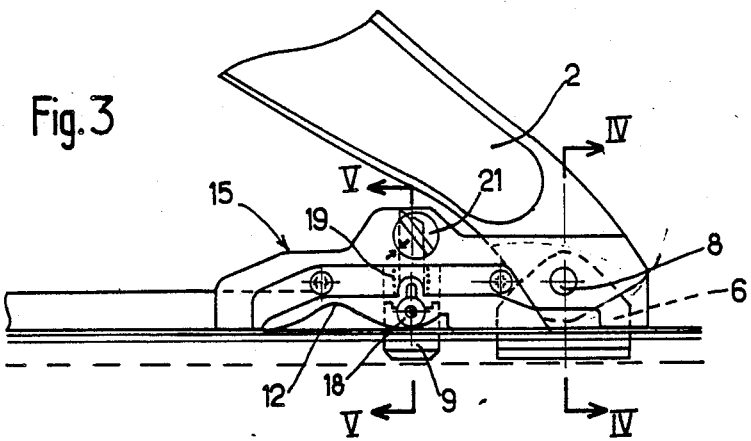
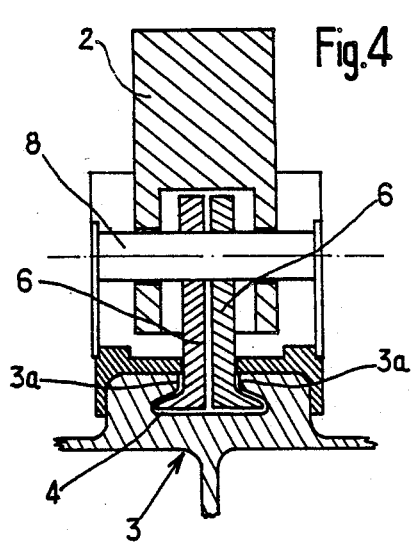
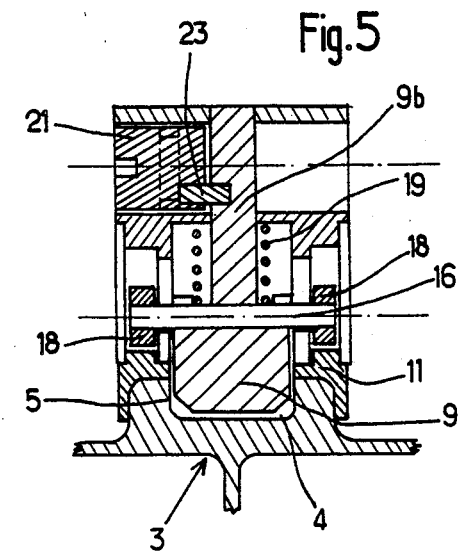
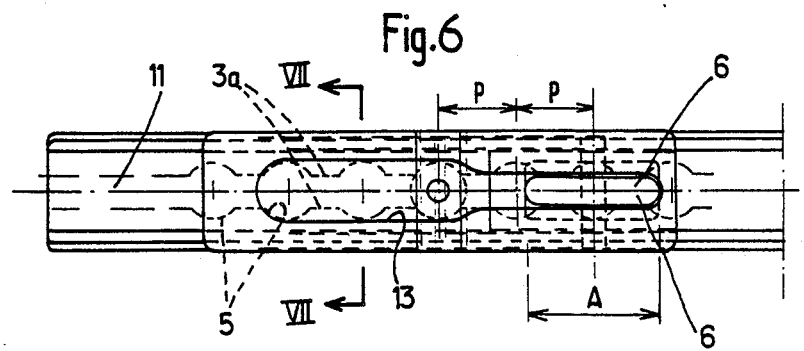
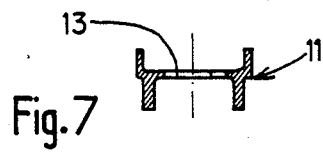

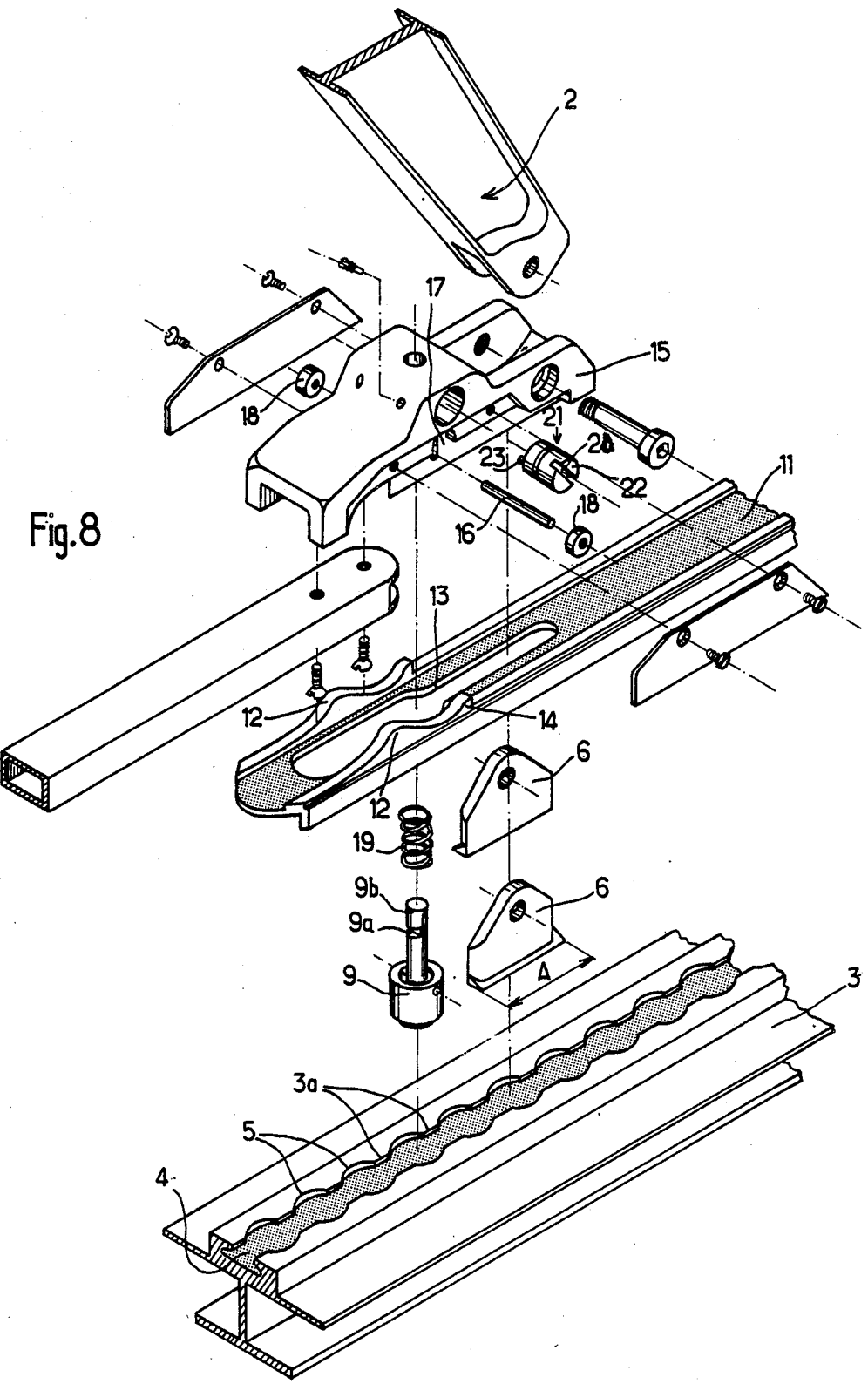

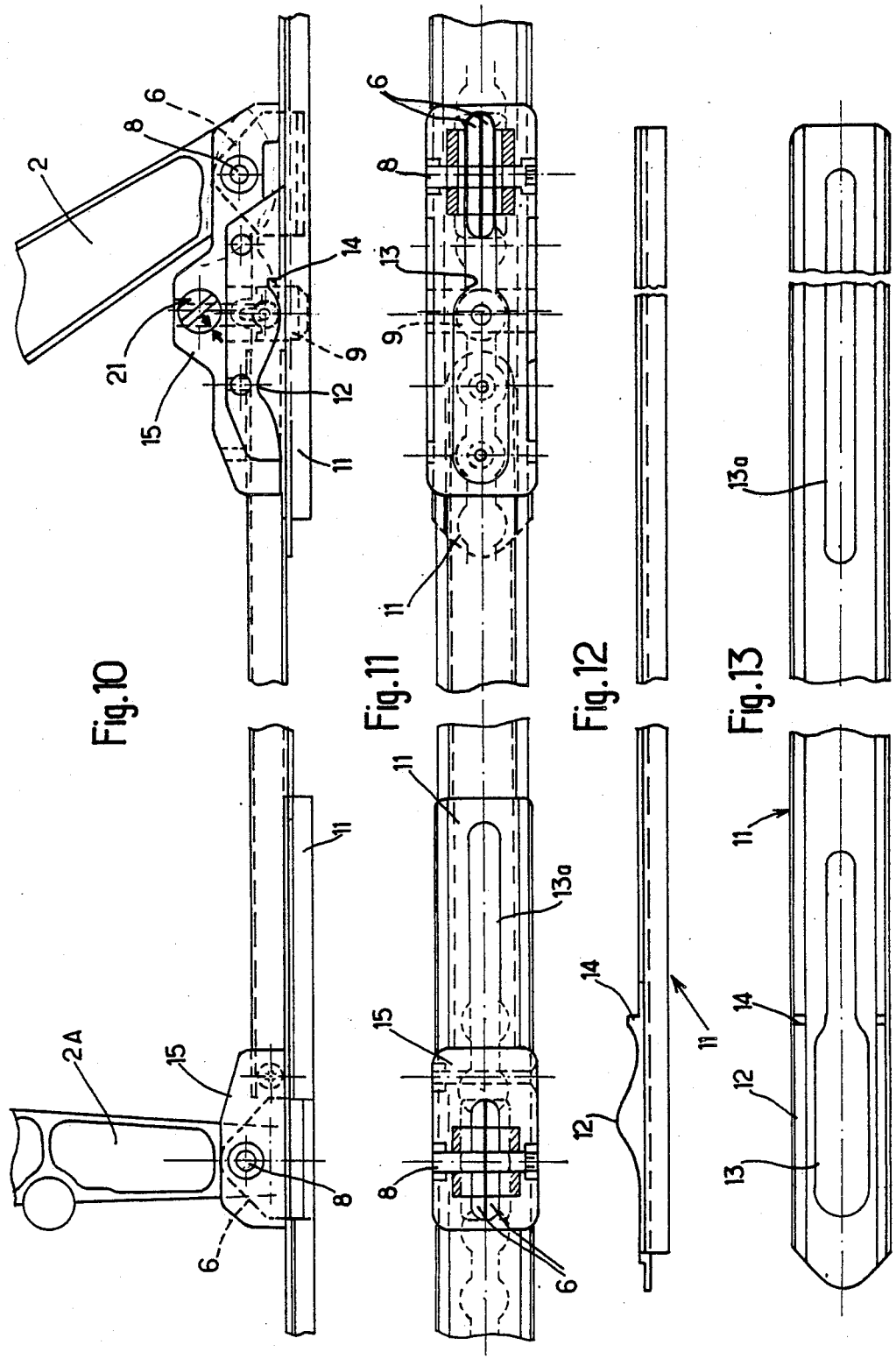

DEVICE FOR VARYING THE DISTANCE BETWEEN THE SEATS IN COMMERCIAL AIRCRAFT

CROSS-REFERENCES TO CO-PENDING APPLICATIONS

This Application is a Continuation-In-Part of my copending U.S. application Ser. No. 156,327, filed June 4, 1980, and now abandoned.

BACKGROUND OF THE INVENTION

The present invention relates to a device for varying the distance or "pitch" between the seats in commercial aircraft.

Commercial aircraft are equipped with longitudinal rails on the floor of the cabin for fixing the passengers' seats. The principle of the connections enables a determined position to be chosen for each seat individually, as a function of the available space and the number of seats.

The distance or the "elementary pitch" between each possible position being universally standardised at 25.4 mm, the resultant "pitch" of the seats is necessarily a whole number of "elementary pitches".

Although they allow a choice of positions, the rails and connections of heretofore known seats are not designed to allow a simple, continuous longitudinal movement of the seats. At the most, their position may be locally adjusted by a few centimeters. It is impossible to change the position of all the seats in a cabin without disconnecting them from the rails one by one, transporting them manually and refixing them in their new position.

This lack of flexibility is due to several reasons, namely:

1. each seat abuts on two rails;
2. the connections of the seats are not designed to slide easily in the rails and the latter are themselves often encumbered with various objects which prevent sliding; and
3. when it is desired to move a seat, this can only be done by applying forces thereon above the level of the rails.

Because of this manual work, it is impossible to balance the efforts on each foot so as to displace them simultaneously. This inevitably results in the seat jamming in the rails and the movement being stopped. More particularly, the longitudinal rails on which the seats are fixed are each provided with a longitudinal groove of dovetail shape. Vertical holes are made in the inner lips of the rail at very regular intervals. Furthermore, the feet of the seats comprise, at the front and rear, lugs which are conical at the base and which may penetrate into the longitudinal rail through one of the holes provided to this end in the opposite lips and which may then be connected thereto after a displacement equal to half an elementary pitch. At the rear, the foot of the seat comprises a vertical bolt which is introduced into one of the holes in the rail after displacement of the foot by half an elementary pitch.

With such a connecting device, the following steps must be taken on each of the two feet when it is desired to fix a seat on the rail:

1. place the bolt in a high position by means of its cam;
2. introduce all the lugs (6 in all) simultaneously at the desired spot in the holes in the rail;
3. displace the whole seat by half an elementary pitch forwards or backwards, so as to locate the bolt in the axis of the desired hole; and
4. rotate the cam so that the bolt descends into the corresponding hole.

To dismantle a seat, these operations are reversed. When a seat is to be displaced by a few elementary pitches, this known device does not enable this operation to be carried out easily, because the efforts exerted on the seat added to the inevitable deformations of the structure of the seat are very frequently the cause of one or more lugs becoming disengaged from the rail, which lugs tend to lift out of the rail, upon passage in the axis of a hole.

SUMMARY OF THE INVENTION

The main object of the present invention is to remedy the above mentioned drawbacks of known seat assemblies, by the provision of a motorized, electromechanical device adaptable to most usual aircraft and seat structures; allowing a controlled displacement of the seats and particularly within a change in their pitch in a determined zone within its commercial classification. To this end, this device for varying the distance or pitch between the seats in commercial aircraft, comprises longitudinal rails provided in their upper horizontal flanges with dovetail grooves and holes pierced in the two inner lips of the rail defining this groove, the distance between two adjacent holes being equal to that of an elementary pitch of displacement of the seat, and, on each foot of a seat, a device for securing the seat on the rail in the desired position, one of the feet comprising a vertically movable bolt engaged in a hole in the rail, is characterised in that it comprises a driving seat, mobile seats disposed in front of and/or behind the driving seat, and a transmission mechanism between the driving seat and the mobile seats, in that the driving seat bears a drive mechanism moved by a motor, this drive mechanism being coupled with elongated connecting members movable in translation, located on each rail and being able to be displaced forwardly or rearwardly by a predetermined distance as a function of the desired change in pitch, in that the transmission mechanism comprises a set of metal slats connecting the feet of the mobile seats together, at rail level, the slats closest to the driving seat being coupled to the elongated connection members, and in that means are associated with the feet of the mobile seats, for automatically controlling the unlocking of the seat as soon as the slats are displaced.

The driving seat may permanently bear a motor of any suitable type and its control panel may be permanently connected to the electrical system of the aircraft and be supplied only when stopped on the ground.

The drive mechanism borne by the driving seat may also be actuated by an independent motor, manouevered by hand and mechanically connected to this drive mechanism.

The elongated connecting members are advantageously constituted by two driving rods, one on each rail, directly actuating in compression or in traction, the metal slats constituting the transmission mechanism. These slats connect the front of each seat to the rear feet of the preceding seat, at rail level. The slats of the seats closest to the driving seat are directly connected to the driving rods.

When a pair of slats is moved, the rear feet of the seat in question are firstly automatically unlocked and the seat is then free to move. As desired, the driving seat may be placed in front or or behind the seat to be moved. The driving seat may also move itself. For maximum displacements of 14 p (p being the elementary pitch chosen, equal to 25.4 mm) of the adjacent seat, the direct manoeuvre is completely automatic in accordance with the established program. The return to the original version is also automatic.

The only manual intervention required consists in locking the seats in their new position as soon as the seats have stopped moving. Although the seats are necessarily set into motion starting from the driving seat, all the seats stop simultaneously as soon as the new arrangement is obtained.

In principle, a set of slats allows the choice between two configurations, namely a large "pitch" and a small "pitch". Apart from the set of slats which also constitutes the program, all the elements of the system are standardized whatever the "pitch" and the type of seats used.

For displacements exceeding 14 p, a series of manoeuvres must be controlled which involve, the displacement of the driving seat itself.

For example, a driving seat located in the ninth row of series of 16 seats located at a distance of 34 p from one and another may displace all seats 1 to 8 forwardly and 9 to 16 rearwardly, reducing the "pitch" between seats from 34 p to 32 p, so as to clear between rows 8 and 9 a space of 32 p sufficient for an extra seat.

All movable seats are equipped, at the rear feet, with an automatic unlocking and manual locking device, which guarantees total safety and maximum reliability. During its displacement, the seat cannot be released from the rails at any point.

BRIEF DESCRIPTION OF THE DRAWINGS

The invention will be more readily understood on reading the following description with reference to the accompapanying drawings, in which:

FIG. 1 is a view in elevation of the main elements constituting the "pitch" varying device according to the invention, the device being placed between a driving seat whose front foot is shown partially and a mobile seat whose rear foot is shown partially, the rear foot of the mobile seat being shown in two positions corresponding to two "pitches" between different seats.

FIG. 2 is a top plan view in horizontal section, of the device illustrated in FIG. 1.

FIG. 3 is a view in elevation and in partial vertical section of the securing device associated with the rear foot of a mobile seat.

FIG. 4 is a view in vertical and transverse section made along line IV—IV of FIG. 3.

FIG. 5 is a view in vertical and transverse section made along line V—V of FIG. 3.

FIG. 6 is a partial plan view of a transmission slat.

FIG. 7 is a view in vertical and transverse section made along line VII—VII of FIG. 6.

FIG. 8 is an exploded view in perspective of a device for securing a rear foot and the transmission slat which is associated therewith.

FIG. 10 is a view in elevation of the elements of the "pitch" varying device which are associated with a seat located in front of the drive seat.

FIG. 11 is a plan view of the elements shown in FIG. 10.

FIG. 12 is a view in elevation of a transmission slat forming part of the device shown in FIGS. 10 and 11.

FIG. 13 is a plan view of the slat shown in FIG. 12.

DESCRIPTION OF THE PREFERRED EMBODIMENTS

Figure 9:
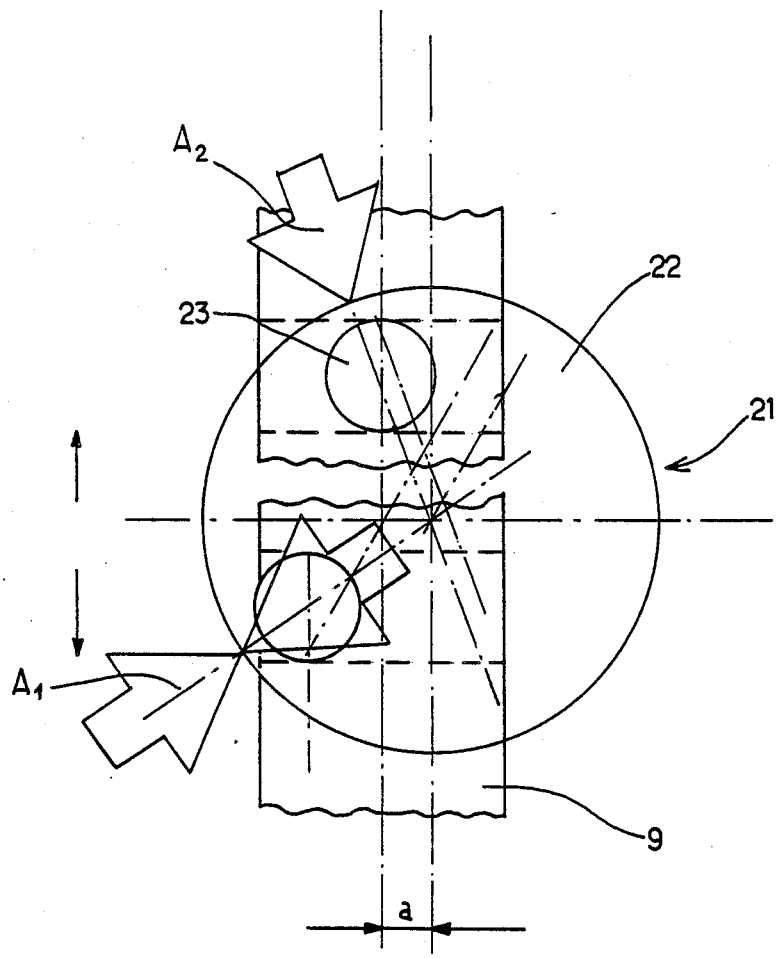
FIG. 9 is a schematic elevational view, on a larger scale, of an embodiment of a mechanism holding the bolt in high position.

Referring now to the drawings, the device according to the invention for varying the distance between the seats in a commercial aircraft, or "pitch", is schematically shown solely and partly by its front foot 1 of one driving seat and another seat located in front of the driving seat or the next mobile seat in front of the fixed seat and shown solely and partly by its rear foot 2. The driving seat is fixed, whilst the seat located in front is mobile. The driving seat E, the mobile seats such as seat A, located in front of the driving seat E, and the other mobile seats F (FIG. 20) located to the rear of the driving seat E are all fixed to longitudinal rails 3.

As shown in FIGS. 4 and 5 each rail 3, of a type currently used on board modern aircraft, has an I-shaped cross section and, in its upper flange, is provided with a longitudinal groove 4 of dovetail section. At very regular intervals, vertical holes 5, with a diameter of about 20 mm, are made in the inner line lips 3a of the rail which are opposite one another and define the groove 4. The inner profile of the rail 3, the diameter of the holes and the distance which separates them are standardised for commercial aircraft in Western countries. The "pitch" of the holes p is equal to 25.4 mm, see FIG. 6.

The front or rear feet of the seats are secured by means of two hooks 6, of L-shaped cross section. Each of the hooks 6 comprises a lower horizontal flange of small width adapted to be engaged in the groove 4, and a long vertical flange. The hooks 6 are introduced individually in the groove 4 of the rail 3, at any point without taking the holes into account. These two pieces 6 are then slid, back to back, as is clearly shown in FIG. 4. The two hooks 6 are then assembled at their top by means of a horizontal, transverse pin 8 which directly ensures connection with the foot 2 of the seat (FIGS. 3 and 4). This securing device is used at the front and rear of each foot. The length A (FIG. 6) of the lower horizontal flanges forming hinges is greater than the "pitch" p of the holes 5 of the rail 3 so as to ensure a positive connection on two successive lips of the rail (FIG. 6) when the seat is maintained locked by means of a vertical bolt 9 in low position. When the bolt 9 is in high position and the seat is displaced forwards or backwards, the hooks 6 slide in the rail 3 but cannot be disengaged therefrom at any point; the unit that they form back to back totally opposes this. The seats may thus be displaced longitudinally without any risk of disengagement.

The seat securing device which has just been described, also after offers considerable security in case of accident since, even if the bolt 9 breaks, the foot of the seat can never be disengaged from the rail either at the front or at the rear.

The device according to the invention is designed to carry out the operations which are imposed automatically and in order, when it is desired to modify the "pitch", i.e., the distance between seats, in a group of seats. These successive operations are as follows:

a. unlock the seats individually;
b. for each seat, individually apply a forward or backward driving force at the lowest possible level and simultaneously on the two feet, so as to avoid jamming;
c. stop the movement when each seat is in the new position desired; and
d. lock the seats in their new position; this latter operation is not provided to be automatic, but manual so as simultaneously to check the locking, which is an essential point for the passengers' safety.

The essential element of the device according to the invention, making it possible to carry out the above operations in order, is constituted by a set of transmission slats 11 mounted for longitudinal sliding on the rails 3. Each of these slats 11 has the form of an inverted U in cross section, by which it slides on the upper flange of the rail 3. This slat 11 bears, along its two longitudinal edges, two parallel cams 12 between which the vertically movable bolt 9 is located. This slat 11 is pierced, in its median part, with a longitudinal slot 13 (FIG. 6) which allows it a forward or rearward movement of 2 p (50.8 mm), by sliding between the rail 3 and the devices 6, 8 for securing the foot of the seat, whatever the vertical position of the bolt 9. At the end of forward stroke, the rear end of the slot 13 comes into abutment against the hooks 6. At the end of rearward stroke, catches 14 provided laterally on the slat 11 come into abutment against a body 15 of the securing device. (FIGS. 1 and 8).

The relative movement or stroke of the slat 11 with respect to the rear foot 2 of the seat is therefore always of 2 p (50.8 mm) whatever the installation. This stroke is necessary to effect the automatic unlocking of the seat, prior to any displacement.

The total stroke of 2 p for the transmission slat 11 and the cams 12 has been chosen, taking into account the following criteria:

1. on the one hand, the variations of "pitch" between the seats necessarily being expressed as a whole number of "elementary pitches" (p=25.4 mm), the total stroke necessary for unlocking must also be measured by a whole number of "elementary pitches" p in order to be taken into account in the program of the variations of the "pitch" between seats.
2. on the other hand, since this stroke fixing the minimum variation of the pitch between seats, the smallest possible whole number must be chosen to cover the smallest changes of "pitch" required. Theoretically, a stroke of one "pitch" p would have been the ideal measurement to obtain the maximum flexibility of the program. However, this would have led to an inclination of the cams 12 requiring much more considerable unlocking forces from the slats 11. A stroke of 2 p corresponds to a correct design of the cam 12 and it constitutes a very acceptable minimum for the most required changes of "pitch". Finally a stroke of 3 p would have led to a longer, heavier securing device and would have constituted too high a minimum for the majority of variations of "pitch" required.

In conclusion, the stroke of 2 p for unlocking constitutes an optimum.

The locking mechanism proper is shown in FIGS. 1, 2, 3, 5, 8, 9, 14, and 15. This mechanism comprises a vertically movable bolt 9 and with which a horizontal, transverse pin 16 is fast. This pin slides in two vertical slots 17 made in the body 15 of the securing device. At its ends, the pin 16 bears two rollers 18 freely mounted thereon. The lateral cams 12 of the transmission slat 11 act respectively on the two rollers 18 so as to push these rollers and consequently the bolt 9 upwardly, during the unlocking stroke. After a stroke equal to an "elementary pitch" p (25.4 mm), or exactly in the middle of the stroke, the cams 12 have caused the total disengagement of the bolt 9 out of the rail 3 and consequently they have ensured the release of the rear foot of the seat.

In the second half of their stroke, the cams 12 clear the space below the rollers 18 which enables the bolt 9, urged downwardly by a spring 19, to return immediately into its initial position if a particular system did not hold it in its high position, unlocked. This system remains blocked during the displacement of the seat which immediately follows the arrival of the transmission slat 11 at the end of stroke. At this moment, in fact, the seat being released is driven forwardly or rearwardly by the slat 11. When the seat occupies its new position, the system for holding the bolt 9 is unlocked manually, with the result that each seat foot is locked individually.

FIG. 9 shows a non-limiting embodiment of a mechanism for maintaining the bolt 9 in raised position. The bolt 9, when it is disengaged from the rail 3 under the action of the cams 12, in a vertical rising movement, rotates a locking cam 21 constituted by a cylinder 22 which has horizontal and transverse axes and by a catch 23 eccentric with respect to these axes. This catch 23 is engaged in a notch 9a provided in a rod 9b extending upwardly from the actual bolt 9 (FIG. 8). When the bolt 9 has arrived at the top of its stroke, being pushed by the cams 12, against the action of compression spring 19, it is kept in its raised position by the catch 23. For the required function to be correctly performed by the cam 21, several conditions must be met. In fact, the kinematics of the cam 21, its position with respect to the axis of the bolt 9 and the coeffecient of internal friction of the pieces in contact must be such that:

1. the upward displacement of the bolt 9, when it is urged by the cams 12, is not blocked by the cam 21; and
2. the downward displacement of the bolt 9, when it is in the high position where it is urged by the spring 19, is effectively blocked by the cam 21.

If this latter condition is fulfilled, unblocking can only be effected manually and in this embodiment the manoeuvre is identical to that of the conventional cams and may be effected with the aid of a screwdriver or coin engaged in a slot 20 provided in the front, outer face of the cam 21.

This assembly also makes it possible to unlock the seats manually which, not being intended to be unlocked automatically, are not mounted on cams 12. Such is particularly the case of the driving seat whose rear foot, not shown in FIG. 1 comprises a cam device 21 for ensuring unlocking thereof.

In summary, the cams 12 and 21 have different possibilities of action on the bolt 9 but which cannot run counter to one another, namely:

The cams 21 bring about automatic unlocking which cam 21 cannot oppose; and cam 21 allows manual unlocking at any moment and it also allows manual locking when the seat is in a stopped position, after an automatic displacement.

The device of the cam 21, although it resembles a known device, differs therefrom in several ways which will be seen from FIG. 9. In fact it is observed that:
- (a) the horizontal axis of the cylinder 22 is eccentric by a distance a (for example by 1.7 mm) with respect to the vertical axis of the bolt 9;
- (b) in the lowered position of the bolt 9, i.e. when the latter is engaged in the rail 3, the catch 23 occupies a position which is clearly offset with respect to the axis of the cam 21, and this results in that any upward displacement of the bolt 9 necessarily brings about the rotation of the cylinder 22;
- (c) in raised position, under the action of the spring 19, the bolt 9 tends to redescend; however, this movement is retained by the catch 23, the thrust of the spring 19 in combination with the frictions between the different pieces producing a torque which opposes the rotation of the cylinder 22;
- (d) finally, the catch 23 has a smaller angular stroke of the order of 105 degrees, compared with the catch of a known device which passes through 180 degrees under manual action.

Referring more particularly to FIGS. 1, 2, 9, and 20, the way in which the connection may be made between the driving seat and the mobile seat located immediately in front, will now be described. The rear foot 2 of the mobile seat is shown in the two possible positions, i.e. the most advanced position (in solid lines) and the rearward most postion (in broken lines). There is no intermediate position. In the advanced position, the bolt 9 is engaged in the rail which, externally, is indicated by the position of the index of the locking cam 21 opposite the reference A1. The transmission slat 11 and the cams 12 are also in advanced position.

To displace the mobile seats A (FIG. 20) rearwardly, the slat 11 is moved via a rack 24 associated with the drive system and with which it is directly coupled.

After a rearward displacement by an "elementary pitch" p, the cams 12 have brought the bolt 9 into high position and the seat A is then free to move. However, the seat moves rearwardly only when the transmission slat 11 has passed over a distance equal to 2 p, i.e. at the moment when the catches 14 come into abutment against the body 15 of the securing device. At this instant, the seat is directly drawn rearwardly by the slat 11 up to the programmed position, which is indicated in broken lines in FIG. 1. In this position, the bolt 9 is in raised unlocked position which follows the movement. In this position, the cam 21 is in unlocking position, this being translated by the index of this cam opposite reference point A2. A manual action is then necessary to return the index of the cam 21 opposite reference point A1 indicating positive locking.

In the case illustrated in FIG. 1, a rearward displacement of the seat by 8 p has been shown by way of example, which in fact requires a displacement by 10 p of the rack 24 and of the slat 11, the distance of 2 p being used for unlocking the seat. The racks 24 are mounted only between the first movable seats in front and back mobile seats and the driving seat.

To return the seat into advanced position, the manoeuvre is exactly the reverse. The rack 24 is propelled forwardly and communicates its movement of advance to the slat 11 and to cams 12. After a stroke p, the bolt 9 is disengaged from the rail and after a stroke of 2 p, the rack 24 comes into abutment with the body 15 of the device of the rear foot 2 which communicates the necessary forward thrust up to the desired position. Rack 24 is fixed to slat 11 by connector C.

FIG. 10 shows the complete installation of a seat located in front of the driving seat. It may be seen that such a seat is placed on two slats 11 establishing a connection of variable length between on the one hand the front foot 2A of the mobile seat, and on the other hand the rear foot 2 of this mobile seat and the front foot of the following seat. The interaction of one seat with respect to the others in front of the driving seat is totally controlled by the design of the connecting slats 11. A typical slat 11 is shown in FIGS. 12 and 13. It comprises at the front a slot 13 of constant dimensions for all the slats, enveloping the bolt 9 and the hooks 6 of a rear foot 2. At the front, the slat 11 also comprises the cams 12 controlling the unlocking of the rear foot 2, and also the catches 14. To the rear, the slat 11 presents another slot 13A enveloping the hooks 6 of the front foot 2A. The length of this slot 13A is equal to A+(ΔP−2), ΔP being defined hereinbelow.

Figure 14:
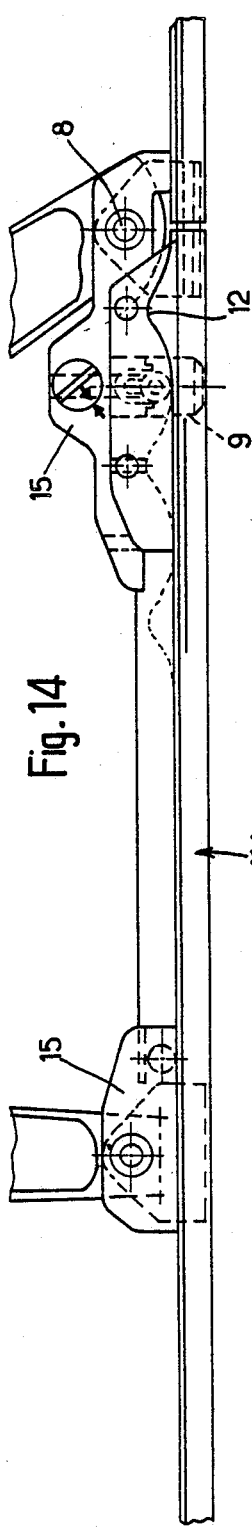
FIG. 14 is a view in elevation of the elements constituting the "pitch" varying device which are associated with a seat located to the rear of the drive seat.
Figure 15:
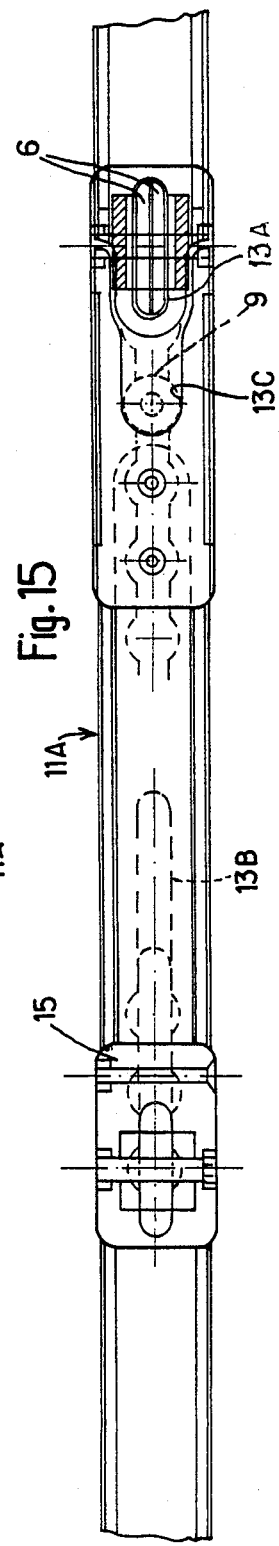
FIG. 15 is a plan view of the constituent elements shown in FIG. 14.
Figure 16:
FIG. 16 is a view in elevation of a transmission slat associated with the device shown in FIGS. 14 and 15.
Figure 17:
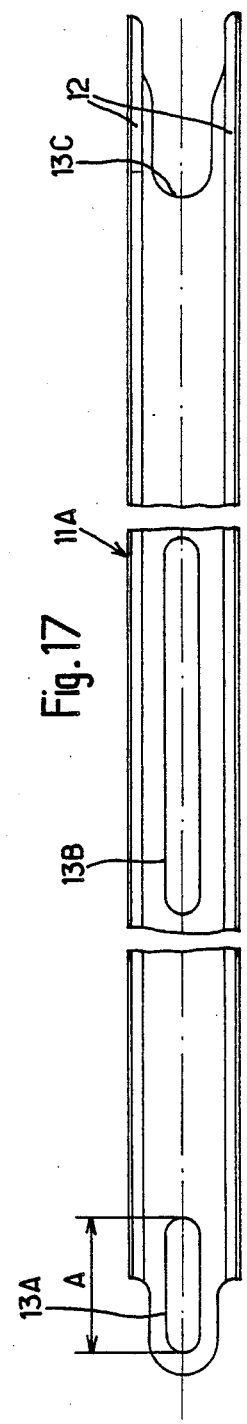
FIG. 17 is a plan view of the transmission slat shown in FIG. 16.
Figure 20:
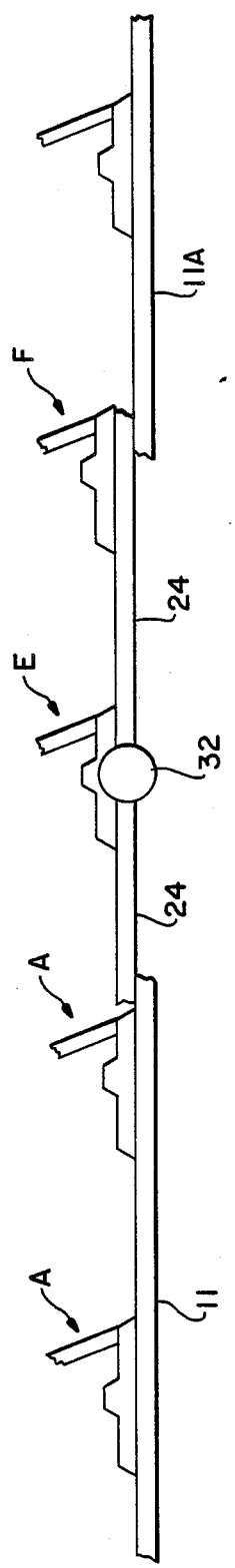
FIG. 20 is a schematic view showing the connection between the driving seat and the front and rear seats.

Assembly is slightly different for the movable seats F located behind the driving seat, although the principle remains the same. Such an assembly is shown in FIGS. 14, 15, and 20. It will be observed that, in this case, the slat 11A extends from the rear foot of one seat to the rear foot of a following seat. This slat 11A bears the cams 12 at the rear and not at the front. Furthermore, it no longer comprises catches 14. This arrangement results from the fact that the driving force D at the origin of the successive displacements comes from the front and no longer from the rear. The slat 11A for transmitting this driving force must therefore necessarily pass freely beneath the front foot of a seat to unlock the rear foot prior to the movement of this seat. To this end, the slat is made in the manner shown in FIGS. 16 and 17. It will be noted that the slat 11A comprises, at the front, a slot 13A of length A corresponding to the length of hooks 6. This slot 13A establishes a rigid and permanent connection with the hooks 6 of the preceeding seat.

At its centre, the slat 11A comprises another slot 13B of length equal to A+ΔP (ΔP is the difference between the largest "pitch" of the seats and the smallest "pitch" in front of the seat in question). The dimension ΔP cannot be less than 2 p to allow the unlocking of the seat. Finally, at the rear, the slat 11A comprises the cams 12 as well as an opening 13C disengaging the bolt 9 from the seat.

Figure 18:
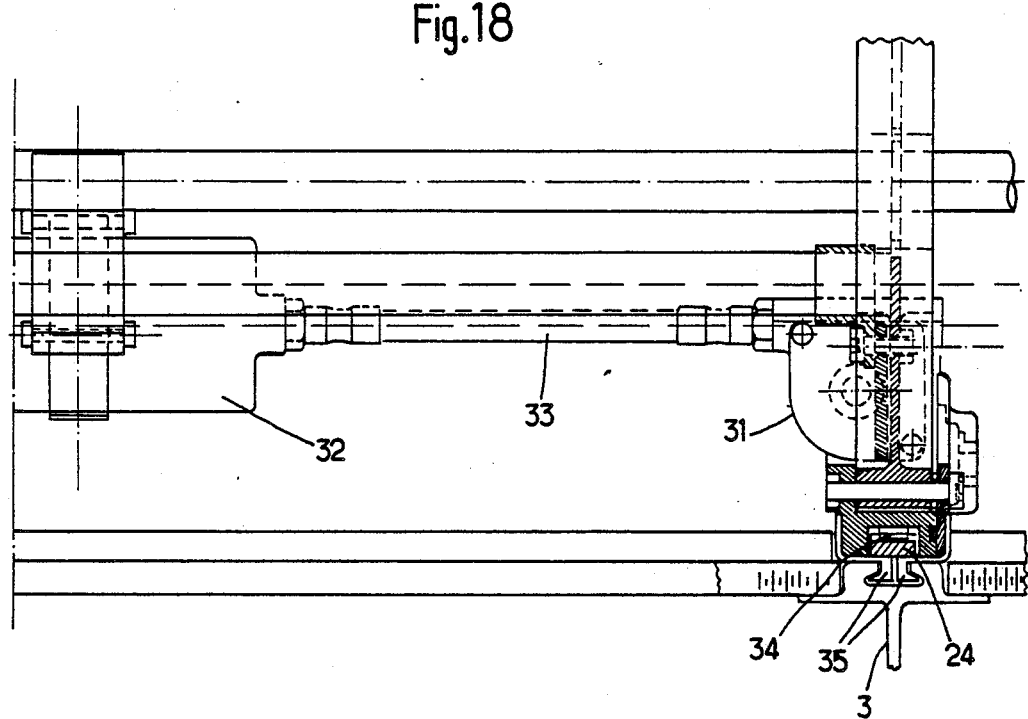
FIG. 18 is a view in partial transverse section of the lower part of the driving seat.

Referring more particularly to FIGS. 1, 18, and 20, an embodiment of the motorized mechanism associated with the driving seats will now be described.

Driving seat is understood to mean a seat E equipped, on each rail 3, with a speed reduction gear 31 communicating a forward or backward movement to a rack 24 located in the axis of the rail, very close to the level of the top surface thereof. This particular arrangement of the racks 24 makes it possible to exert the necessary linear forces, forwardly or rearwardly, on the nearest seats, in front of or behind the driving seat, without introducing any parasitic torque. The movement of the two racks 24, located along the two longitudinal rails 3, is effected in perfect synchronisation with a view to avoiding any jamming of the mobile seats in the rails. The distance between the speed reducer 31 and the rear foot of the drive seat limits the length of the rack and its useful stroke to about 16 p. This results in that, due to the unlocking of the first seat which requires a stoke of 2 p, a driving seat may actuate a maximum of about 7 mobile seats in automatic succession, assuming that the variation of "pitch" between each seat does not exceed 2 p. The synchronisation between the racks is obtained by the use of a motor which simultaneously actuates the two speed reducers.

In the embodiment shown in FIG. 18, the motor 32 is of the electric type and it is fixed to the structure of the seat between the two front feet, preferably towards the centre. It actuates the two speed reducers 31 disposed laterally by means of two tubes or torsion cables 33 which directly actuate an endless screw. The first toothed wheel in each reducer 31 is mounted freely on its axis and it transmits its torque by means of a torque limiter device in a manner known per se. A second stage comprising an endless screw and a toothed wheel, drives a third toothed wheel 34 which directly actuates the rack 24. The forward or rearward movements are obtained by reversal of the direction of rotation of the motor.

According to another embodiment, the motor is not fixed between the feet of the seat, but it is used manually as a portable tool. In this case, the two reducers are directly connected together by a single torsion cable 33. The portable motor is connected to a lateral driven shaft of the first endless screw of one or the other reducer, and its function is identical.

A pneumatic motor or a motor of any other type may be used in place of an electric motor, their operation being identical for displacing the seats.

As may be seen in FIGS. 1, 2, and 18, it is the speed reducer 31 which, on each rail 3, establishes the structural connection between the foot 1 and the rail 3. This arrangement is the only one which allows the rack 24 to be located exactly in the axis of the rail as close as possible to its top surface. The foot 1 is fixed to the speed reducer 31 by one or two bolts.

The reducer 31 is fixed to the rail by two hooks 35 mounted back to back, similar to hooks 6. Their shape is, however, different above the level of the rail. Whilst hooks 6 are straight, the hooks 35 clear the space immediately above so as to allow the rack 24 to pass freely. The hooks 35 form a Z which envelopes the reducer at its base and is fixed thereto by a row of screws 36.

Figure 19:
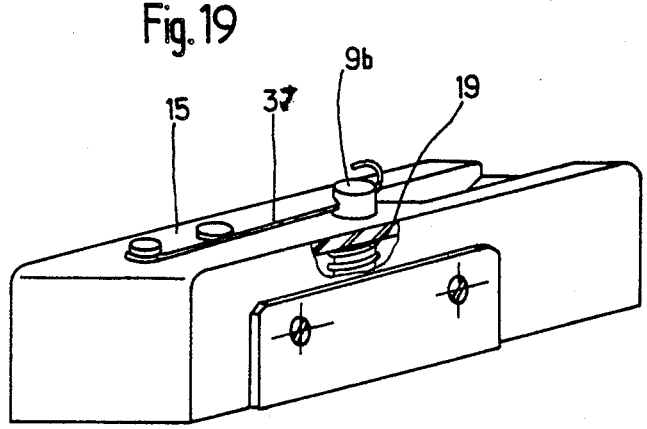
FIG. 19 is a view in perspective of a variant embodiment of the device holding the bolt in high position.

FIG. 19 illustrates a modification of the means making it possible to hold the bolt 9 in raised position. In this modification, the bolt 9 is maintained in this position, not by the cam 21, but by a spring 37 which is engaged in a slot in the rod or stem 9b of the bolt 9 when this latter is in raised position. The spring 37 is fixed to the body 15 of the securing device.

To lock the seat after an automatic displacement, it suffices to disengage the spring 37 and to allow the bolt 9 to redescend under the action of the return spring 19.

This device for holding the bolt is more simple to construct than the one schematically illustrated in FIGS. 8 and 9.

It is to be understood that the descriptions presented in the foregoing specification are merely illustrative of this invention and are not intended to limit it in any manner. The scope of the invention is to be determined solely by the appended claims.

I claim:

1. A device for varying the distance or pitch between seats of commercial aircraft, comprising:

longitudinal rails having upper horizontal flanges;

said rails having dovetail shaped grooves defined by two inner lips of the rails, and holes in said lips, the distance between two adjacent holes being equal to that of an elementary pitch of displacement of the seat;

each seat having a front foot and a rear foot, each provided with hooks, and on each foot of a seat, a device for securing said seat to said rail in the desired position;

one of said feet comprising a vertically mobile bolt engaging in a hole in said rail and the hook on said rear foot;

said seats including a fixed driving seat having a drive mechanism and mobile seats, at least one of said mobile seats being disposed in front of, and another of said mobile seats being disposed behind said driving seat;

driving racks coupled to said drive mechanism, located one on each rail and able to be displaced forwards or backwards by a predetermined distance depending on the desired change in pitch;

a transmission mechanism between said driving and said mobile seats comprising a set of slats and slidable on said rails, connecting, at rail level, the feet of said mobile seats together, said slats of the mobile seats nearest said driving seat being coupled to said connection racks, and said racks actuating said slats;

at least one of said mobile seats being located in front of the driving seat and placed on said two slats for establishing a connection of variable length between the foot of said at least one mobile seat and the rear foot of the preceding seat and the rear foot of said at least one mobile seat and the front foot of the following seat;

each of said slats having at the front thereof slots of constant dimensions for all the slats, enveloping the bolt and the hook of a rear foot;

at the rear of said slats, another longitudinal slot enveloping said hooks of the front foot and of a length equal to A+(ΔP−2), A being the length of said hooks and ΔP being the difference between the largest pitch of the seat and the smallest pitch in front of the seat in question; and control and securing means associated with the feet of each mobile seat for automatically controlling the unlocking of the seat as soon as said slats are displaced;

each slat having a cross section in the form of an inverted U and being slidably mounted on said flange of a said rail;

each slat bearing on its upper surface two parallel and opposite cams, and a vertically movable bolt between said cams;

each slat having lateral catches and being pierced, in its median part, with a longitudinal slot allowing said slat a forward or backward movement equal to two elementary pitches by enabling said slat to slide between said rail and said control means, whatever the vertical position of said bolt;

said forward movement being determined by the abutting of the rear end of the slot against said securing means, said rearward movement being determined by said catches on said slat and abutting against said securing means.

2. A device as claimed in claim 1, wherein said driving seat carries a motor coupled to said drive mechanism.

3. A device as claimed in claim 1, including an independent motor maneuvered by hand and mechanically connected to said drive mechanism.

4. A device as claimed in claim 1, further including vertical slots in said securing means, a horizontal transverse pin slidably mounted in said vertical slots and bearing on its ends rollers acting on said cams;

said bolt being fast with with said pin; and resilient means permanently urging said bolt downwardly.

5. A device as claimed in claim 4, further including a stem extending said bolt upwardly and having a notch therein;

a rotatable locking cam comprising a cylinder of horizontal and transverse axis offset with respect to the vertical axis of said bolt and a catch eccentric with respect to this axis and engaged in said notch of said stem.

6. A device as claimed in claim 4, wherein said resilient means consists of a spring fixed to said securing means.

7. A device as claimed in claim 2, wherein said motor actuates speed reducers operatively connected with said slats.

8. A device as claimed in claim 2, including an independent motor maneuvered by hand and mechanically connected to said drive mechanism.

9. A device as claimed in claim 1, further including vertical slots in said securing means, a horizontal transverse pin slidably mounted in said vertical slots and bearing on its ends rollers acting on said cams;

10. A device as claimed in claim 9, further including a stem extending said bolt upwardly and having a notch therein;

a rotatable locking cam comprising a cylinder of horizontal and transverse axis offset with respect to the vertical axis of said bolt and a catch eccentric with respect to this axis and engaged in said notch of said stem.

11. A device as claimed in claim 10, wherein said resilient means consists of a spring fixed to said securing means.

12. A device as claimed in claim 11, wherein said motor actuates speed reducers operatively connected with said slats.

13. A device as claimed in claim 11, wherein said resilient means consists of a spring fixed to said securing means.

* * * * *